United States Patent
Mu et al.

(10) Patent No.: US 11,632,753 B2
(45) Date of Patent: Apr. 18, 2023

(54) METHOD AND APPARATUS FOR INDICATING INFORMATION AND INTERPRETING INFORMATION, BASE STATION AND USER EQUIPMENT

(71) Applicant: BEIJING XIAOMI MOBILE SOFTWARE CO., LTD., Beijing (CN)

(72) Inventors: Qin Mu, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 118 days.

(21) Appl. No.: 17/079,306

(22) Filed: Oct. 23, 2020

(65) Prior Publication Data

US 2021/0045102 A1     Feb. 11, 2021

Related U.S. Application Data

(63) Continuation of application No. PCT/CN2018/084463, filed on Apr. 25, 2018.

(51) Int. Cl.
| | |
|---|---|
| *H04W 72/04* | (2009.01) |
| *H04W 72/044* | (2023.01) |
| *H04L 5/00* | (2006.01) |

(52) U.S. Cl.
CPC ......... *H04W 72/044* (2013.01); *H04L 5/0094* (2013.01); *H04W 72/042* (2013.01)

(58) Field of Classification Search
CPC .. H04W 72/042; H04W 72/044; H04L 5/0094
See application file for complete search history.

(56) References Cited

U.S. PATENT DOCUMENTS

| | | |
|---|---|---|
| 2013/0028138 A1 | 1/2013 | Hao et al. |
| 2014/0241260 A1 | 8/2014 | Schmidt et al. |
| | (Continued) | |

FOREIGN PATENT DOCUMENTS

| | | |
|---|---|---|
| CN | 101657018 A | 2/2010 |
| CN | 101808409 A | 8/2010 |
| | (Continued) | |

OTHER PUBLICATIONS

Huawei, HiSilicon, "R1-1803888 On more flexible PRB for PDSCH/PUSCH resource allocation," Apr. 6, 2018 (Year: 2018).*

(Continued)

*Primary Examiner* — Maharishi V Khirodhar
*Assistant Examiner* — Kenneth P Hunt
(74) *Attorney, Agent, or Firm* — Arch & Lake LLP

(57) ABSTRACT

Methods and apparatuses are provided for indicating information and interpreting information. A method of indicating information includes: generating a resource allocation informing format which includes a first informing format indicating that each of reserve statuses in a physical resource block (PRB) resource allocation field is configured for indicating a resource allocation scheme, or a second informing format indicating that one or more of the reserve statuses in the PRB resource allocation field is configured for indicating an early termination of uplink transmission while each of remaining reserve statuses is configured for indicating the resource allocation scheme; and sending the resource allocation informing format to UE.

16 Claims, 8 Drawing Sheets

(56) References Cited

U.S. PATENT DOCUMENTS

| | | | |
|---|---|---|---|
| 2015/0092694 A1 | 4/2015 | You et al. | |
| 2016/0316374 A1 | 10/2016 | Xu et al. | |
| 2018/0007672 A1 | 1/2018 | Chen et al. | |

FOREIGN PATENT DOCUMENTS

| | | | | |
|---|---|---|---|---|
| CN | 102036387 | A | 4/2011 | |
| CN | 103716125 | A | 4/2014 | |
| CN | 105515735 | A | 4/2016 | |
| CN | 106454694 | A | 2/2017 | |
| CN | 107078863 | A | 8/2017 | |
| RU | 2016139433 | A | 4/2018 | |
| WO | 2016073591 | A1 | 5/2016 | |
| WO | WO-2019191998 | A1 * | 10/2019 | ........... H04L 5/0044 |

OTHER PUBLICATIONS

Clarivate Analytics, "English Translation WO-201919198 A1," 2022 (Year: 2022).*

State Intellectual Property Office of the People's Republic of China, First Office Action and Search Report Issued in Application No. 2018800006502, dated Jun. 21, 2019, with English translation, (10p).

State Intellectual Property Office of the People's Republic of China, First Office Action and Search Report Issued in Application No. 2019113018063, dated Sep. 28, 2020, with English translation, (11p).

ISA State Intellectual Property Office of the People's Republic of China, International Search Report Issued in Application No. PCT/CN2018/084463, dated Jan. 22, 2019 with English translation, (4p).

Sony,"Reserved resources for supporting NR coexistence with eMTC and NB-IoT",3GPP TSG RAN WG1 Meeting #90, Prague, Czech Republic, R1-1712979, Aug. 21-25, 2017, (5p).

Huawei, HiSilicon, "Remaining issues on reserved resources", 3GPP TSG RAN WG1 Meeting 90bis, Prague, Czech Republic, R1-1717079, Oct. 9-13, 2017, (4p).

ZTE, "Flexible starting PRB of PUSCH/PDSCH for MTC",3GPP TSG RAN WG1 Meeting #92, Athens, Greece, R1-1801601, Feb. 26-Mar. 2, 2018, (5p).

Qualcomm Incorporated, "Flexible allocation for PDSCH and PUSCH for efeMTC", 3GPP TSG RAN WG1 Meeting #92, Athens, Greece, R1-1802330, Feb. 26-Mar. 2, 2018, (6p).

Fei, ZeSong et al., "Massive Machine-Type Communication Performance Analysis Based on Long Term Evolution (LTE) System", Transactions of Beijing Institute of Technology, vol. 37 No. 3, Mar. 2017, (6p).

Qualcomm Incorporated, "Uplink HARQ-ACK feedback", 3GPP TSG RAN WG1 Meeting 91,Reno, USA, R1-1720418, Nov. 27-Dec. 1, 2017, (6p).

Indian Patent Office Action, Office Action Issued in Application No. 202047050220, dated Dec. 14, 2021, 6 pages.

Japanese Patent Office Action, Office Action Issued in Application No. 2020-560159, dated Dec. 3, 2021, 6 pages. (Submitted with Machine Translation).

Lenovo, Motorola Mobility, "Uplink HARQ-ACK feedback in efeMTC", 3GPP TSG RAN WG1 Meeting #91, R1-1719739, Reno, USA, Nov. 27-Dec. 1, 2017, 5 pages.

Extended European Search Report Issued in Application No. 18916605.1, dated Mar. 31, 2021, (11p).

Huawei, HiSilicon,"Further considerations on HARQ-ACK feedback for PUSCH in eFeMTC", 3GPP TSG RAN WG1 Meeting #92, Athens, Greece, R1-1801431, Feb. 26-Mar. 2, 2018, (8p).

Huawei, HiSilicon,"On more flexible starting PRB for PDSCH/PUSCH resource allocation", 3GPP TSG RAN WG1 Meeting #92bis, Sanya, China, R1-1803888, Apr. 16-20, 2018, (8p).

ISA State Intellectual Property Office of the People's Republic of China, Written Opinion of the International Searching Authority Issued in Application No. PCT/CN2018/084463, dated Jan. 22, 2019, (9p).

EP Communication of EP Application No. 18916605.1 dated Apr. 19, 2022, (8p).

JPOA Decision of Refusal Issued in Application No. 2020-560159, dated Jul. 19, 2022 with English Machine translation,(6p).

ZTE, Sanechips, "Summary of Uplink HARQ-ACK Feedback for MTC", 3GPP TSG RAN WG1 Meeting #92bis, R1-1805311, Sanya, China, Apr. 16-20, 2018, (9p).

European Patent Office, Office Action Issued in Application No. 18916605.1, dated Nov. 10, 2022, (7p).

Korean Intellectual Property Office, Office Action Issued in Application No. 10-2020-7033512, dated Jan. 20, 2023, (Submitted with Machine Translation), (11p).

Japanese Patent Office, Reconsideration Report by Examiner before Appeal Issued in Application No. 2020-560159, dated Dec. 27, 2022, (Submitted with Machine Translation), (4p).

* cited by examiner

METHOD AND APPARATUS FOR INDICATING INFORMATION AND INTERPRETING INFORMATION, BASE STATION AND USER EQUIPMENT

CROSS-REFERENCE TO RELATED APPLICATION

This application is a continuation application of International Application No. PCT/CN2018/084463, filed on Apr. 25, 2018, the disclosure of which is incorporated herein by reference in its entirety for all purposes.

TECHNICAL FIELD

The present disclosure relates to the field of communication technology, and in particular, relates to methods and apparatuses for indicating information, methods and apparatuses for interpreting information, a base station, user equipment (UE), and a computer-readable storage medium.

BACKGROUND

With the development of communication technology, machine type communication (MTC) has emerged. The MTC, as a kind of machine-to-machine communication without human beings' participation, is widely used in various fields such as intelligent city, intelligent agriculture, and intelligent transportation.

A basic communication framework of the MTC has been formed based on Releases 12 and 13 in Long Term Evolution (LTE), with characteristics such as low complexity or low cost, enhanced coverage, and saved power. In particular, low complexity or low cost is achieved by limiting communication bandwidth for a MTC terminal. Typically, the MTC can support a communication bandwidth of 6 physical resource blocks (PRBs). To support a narrowband (NB) communication mode for the MTC, in Release 13, the entire system bandwidth is divided into multiple narrowbands, and a base station is to allocate one of the multiple narrowbands to a certain MTC terminal and then further allocate PRB resources within the allocated narrowband. For allocating the PRBs within the narrowband, a scheme of LTE uplink resource allocation type 0 is reused to indicate a starting point of and an amount of allocated resources. For a bandwidth of 6 PRBs, a total of 5 bits for indicating are assigned, of which 21 values indicate valid resource allocation statuses and 11 values indicate other statuses as reserve statuses.

Moreover, to achieve the coverage enhancement for the MTC, in Release 13, a repetition transmission mode is adopted such that a transmitter is to transmit an identical content repeatedly in a number of transmission time units and a receiver is to perform information recovery by combining the content transmitted repeatedly, where a times of the repetition transmission is generally set in accordance with channel condition.

Further, new characteristics have been introduced in LTE Release 15 to save power and improve resource utilization efficiency. One of the characteristics is an early termination of uplink transmission, and another is a more flexible resource allocation.

The early termination of uplink transmission is introduced because the repetition times of transmitting uplink data is set by the base station in accordance with user's channel condition and due to factors such as errors of channel measurement, volatility of the channel and the like, may be higher than a times of the repetition transmission required by an actual demodulating process, which brings additional power consumption of the MTC terminal.

The realization principle of the early termination of uplink transmission is that the base station may try to demodulate data which is being repeatedly transmitted by the user end, and if the data is successfully demodulated, send a corresponding transmission-early-terminating indication to the UE to terminate its ongoing repetition transmission of the uplink data.

The foregoing transmission-early-terminating indication information is designed based on downlink control information (DCI) of MTC uplink scheduling. One way accepted by 3rd Generation Partnership Project (3GPP) is to reuse one or more reserve statuses in a PRB resource assignment field. For example, when a reserve status in the above-mentioned PRB resource assignment field is 11111, it can be understood by the UE to terminate the uplink repetition transmission.

The flexible resource allocation is introduced because in the light of NB's definition, a misalignment between a boundary of an NB in the MTC and a boundary of a resource block group (RBG) defined by LTE may be led. RBG fragmentations may be generated when a certain NB is occupied by the MTC, and then some RBs are banned from being used by another LTE user, which reduces the resource utilization efficiency. To avoid this problem, a more flexible resource allocation scheme is introduced to reduce the RBG fragmentations. The flexible resource allocation scheme enables not only allocating RB resources in a configured NB, but also allocating RB resources in a neighboring NB to match the RBG boundary, so as to avoid the RBG fragmentations and thus avoid resource waste.

However, how to indicate the newly added flexible resource allocation scheme is an urgent technical problem to be solved. In related art, it still follows a way of reusing the 11 reserve statuses in the PRB resource assignment field. However, if the UE is configured simultaneously with the flexible resource allocation and the early termination of uplink transmission and these two characteristics both reuse the reserve statuses in the PRB resource assignment field, when receiving a reserve status shared by these two characteristics, the UE cannot determine a meaning of the currently received reserve status, which accordingly causes a confusion in behavior of the UE.

SUMMARY

In view of the above, the present disclosure provides methods and apparatuses for indicating information, methods and apparatuses for interpreting information, a base station, UE, and a computer-readable storage medium, so that UE for MTC can interpret a received current reserve status correctly even if the UE is configured simultaneously with two functions comprising an early termination of uplink transmission and a flexible resource allocation, thereby avoiding a confusion in behavior of the UE.

According to a first aspect of the present disclosure, a method of indicating information, being applicable to a base station, includes: generating a resource allocation informing format that includes a first informing format indicating that each of reserve statuses in a physical resource block (PRB) resource assignment field is configured for indicating a resource allocation scheme, or a second informing format indicating that one or more of the reserve statuses in the PRB resource assignment field is configured for indicating an early termination of uplink transmission while each of remaining reserve statuses is configured for indicating the resource allocation scheme; and sending the resource allocation informing format to user equipment (UE).

According to a second aspect of the present disclosure, a method of interpreting information, being applicable to user equipment (UE), includes: receiving a resource allocation informing format sent by a base station, where the resource allocation informing format includes a first informing format indicating that each of reserve statuses in a physical resource block (PRB) resource assignment field is configured for indicating a resource allocation scheme, or a second informing format indicating that one or more of the reserve statuses in the PRB resource assignment field is configured for indicating an early termination of uplink transmission while each of remaining reserve statuses is configured for indicating the resource allocation scheme; determining an interpreting scheme for interpreting the PRB resource assignment field based on a current state, where the interpreting scheme includes a first interpreting scheme corresponding to the first informing format or a second interpreting scheme corresponding to the second informing format; and interpreting a received current reserve status based on the determined interpreting scheme, and performing an operation based on an interpreted result.

According to a third aspect of the present disclosure, a base station includes: a processor; and a memory for storing instructions executable by the processor. The processor is configured to: generate a resource allocation informing format that includes a first informing format indicating that each of reserve statuses in a physical resource block (PRB) resource assignment field is configured for indicating a resource allocation scheme, or a second informing format indicating that one or more of the reserve statuses in the PRB resource assignment field is configured for indicating an early termination of uplink transmission while each of remaining reserve statuses is configured for indicating the resource allocation scheme; and send the resource allocation informing format to user equipment (UE).

According to a fourth aspect of the present disclosure, user equipment includes: a processor; and a memory for storing instructions executable by the processor. The processor is configured to: receive a resource allocation informing format sent by a base station, where the resource allocation informing format includes a first informing format indicating that each of reserve statuses in a physical resource block (PRB) resource assignment field is configured for indicating a resource allocation scheme, or a second informing format indicating that one or more of the reserve statuses in the PRB resource assignment field is configured for indicating an early termination of uplink transmission while each of remaining reserve statuses is configured for indicating the resource allocation scheme; determine an interpreting scheme for interpreting the PRB resource assignment field based on a current state, where the interpreting scheme includes a first interpreting scheme corresponding to the first informing format or a second interpreting scheme corresponding to the second informing format; and interpret a received current reserve status based on the determined interpreting scheme, and perform an operation based on an interpreted result.

According to a fifth aspect of the present disclosure, there is provided a non-transitory computer-readable storage medium having computer instructions stored thereon, where when the instructions are executed by a processor, the steps of the method of indicating information described above are performed.

According to a sixth aspect of the present disclosure, there is provided a non-transitory computer-readable storage medium having computer instructions stored thereon, where when the instructions are executed by a processor, the steps of the method of interpreting information described above are performed.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
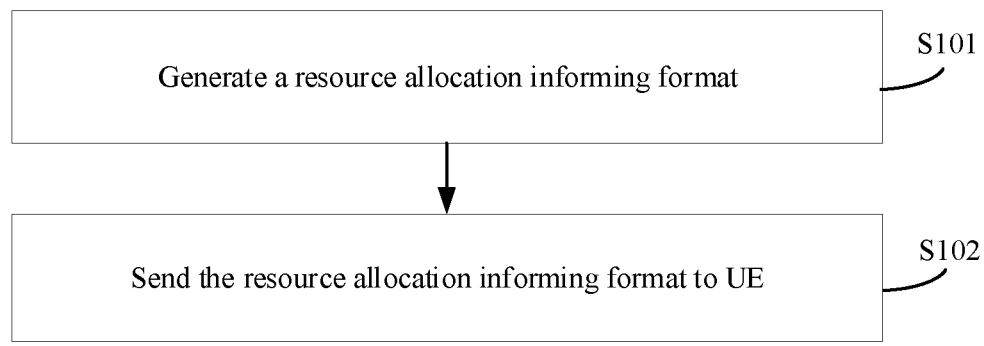
FIG. 1 is a flowchart illustrating a method of indicating information according to an example of the present disclosure.

Exemplary embodiments will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of indicating information according to an example of the present application. This embodiment is described from a base station side. As shown in FIG. 1, the method of indicating information includes the following steps.

At step S101, a resource allocation informing format is generated. The resource allocation informing format includes a first informing format or a second informing format. The first informing format indicates that each of reserve statuses in a PRB resource assignment field is configured for indicating a resource allocation scheme. The second informing format indicates that one or more of the reserve statuses in the PRB resource assignment field is configured for indicating an early termination of uplink transmission while each of remaining reserve statuses is configured for indicating the resource allocation scheme.

In one or more embodiments, the base station may generate the resource allocation informing format based on a function configured in UE. For example, the second informing format may be generated when the UE is configured with a function for the early termination of uplink transmission, and the first informing format may be generated when the UE is not configured with the function for the early termination of uplink transmission.

In one or more embodiments, the base station may generate the resource allocation informing format based on both the function configured in the UE and whether the UE is currently performing an uplink transmission. For example, the second informing format may be generated when the UE is configured with the function for the early termination of uplink transmission and is currently performing the uplink transmission, the first informing format may be generated when the UE is configured with the function for the early termination of uplink transmission and is not currently performing the uplink transmission, and the first informing format may be generated when the UE is not configured with the function for the early termination of uplink transmission.

It can be seen that, in the embodiments, how to generate the resource allocation informing format is flexible and diverse.

In some embodiments, the generated first informing format may be as shown in Table 1:

TABLE 1

The meanings of the PBR resource assignment field in the first informing format

| PRB resource assignment field | Physical meaning |
|---|---|
| 00000 (0)-10100(20) | indicating a PRB resource allocation scheme within NB |
| reserve statuses 10101(21)-11111 (31) | indicating a resource allocation scheme |

In some embodiments, the generated second informing format may be as shown in
Table 2:

TABLE 2

The meanings of the PBR resource assignment field in the second informing format

| PRB resource assignment field | Physical meaning |
|---|---|
| 00000 (0)-10100(20) | indicating a PRB resource allocation scheme within NB |
| reserve statuses 10101(21)-11110 (30) | indicating a resource allocation scheme |
| reserve status 11111 (31) | indicating an early termination of uplink transmission |

It should be noted that the foregoing Table 1 and Table 2 are only examples. In practical applications, the meanings of the PBR resource assignment field indicated by the first informing format and the second informing format may be varied.

At step S102, the resource allocation informing format is sent to the UE.

The base station may send the resource allocation informing format to the UE after generating the resource allocation informing format.

In the above embodiments, by generating the resource allocation informing format and transmitting it to the UE, the UE can interpret a received current reserve status correctly even if the UE is configured simultaneously with two functions comprising an early termination of uplink transmission and a flexible resource allocation, thereby avoiding a confusion in behavior of the UE.

Figure 2:
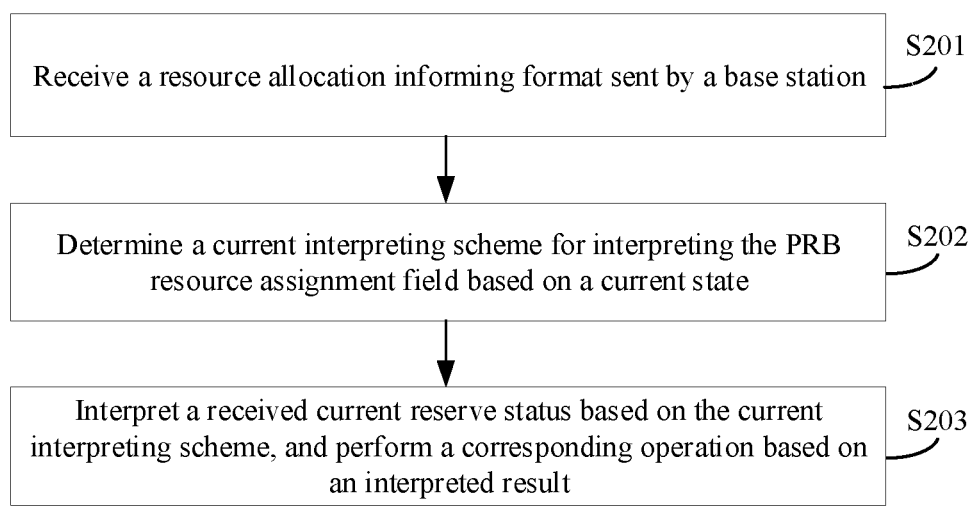
FIG. 2 is a flowchart illustrating a method of interpreting information according to an example of the present disclosure.

FIG. 2 is a flowchart illustrating a method of interpreting information according to an example of the present disclosure. This embodiment is described from a UE side. As shown in FIG. 2, the method of interpreting information includes the following steps.

At step S201, a resource allocation informing format sent by a base station is received. The resource allocation informing format includes a first informing format or a second informing format. The first informing format indicates that each of reserve statuses in a PRB resource assignment field is configured for indicating a resource allocation scheme. The second informing format indicates that one or more of the reserve statuses in the PRB resource assignment field is configured for indicating an early termination of uplink transmission while each of remaining reserve statuses is configured for indicating the resource allocation scheme.

At step S202, a current interpreting scheme for interpreting the PRB resource assignment field is determined based on a current state. The interpreting scheme includes a first interpreting scheme or a second interpreting scheme, with the first interpreting scheme corresponding to the first informing format and the second interpreting scheme corresponding to the second informing format.

In one or more embodiments, if the current state includes a current configuration, the step that the current interpreting scheme for interpreting the PRB resource assignment field is determined based on the current state includes: it is determined to adopt the second interpreting scheme if the UE is configured with a function for the early termination of uplink transmission, or to adopt the first interpreting scheme if the UE is not configured with the function for the early termination of uplink transmission.

In one or more embodiments, if the current state includes the current configuration and a current operation, the step that the current interpreting scheme for interpreting the PRB resource assignment field is determined based on the current state includes: it is determined to adopt the second interpreting scheme if the UE is configured with the function for the early termination of uplink transmission and is currently performing an uplink transmission, to adopt the first interpreting scheme if the UE is configured with the function for the early termination of uplink transmission but is not currently performing the uplink transmission, or to adopt the first interpreting scheme if the UE is not configured with the function for the early termination of uplink transmission.

In the embodiments, the current interpreting scheme for interpreting the PRB resource assignment field can be determined in a variety of ways, with flexible and diverse implementations.

At step S203, a received current reserve status is interpreted based on the current interpreting scheme, and a corresponding operation is performed based on an interpreted result.

The received current reserve status may be interpreted based on the first interpreting scheme if the current interpreting scheme is the first interpreting scheme, and based on the second interpreting scheme if the current interpreting scheme is the second interpreting scheme.

In some embodiments, if the interpreted result is that the current reserve status indicates an identifier of one or more allocated resources, an operation may be performed with the one or more allocated resources, for example, data may be transmitted with the one or more allocated resources. And, if the interpreted result is that the current reserve status indicates the early termination of uplink transmission, an ongoing repetition transmission of uplink data is terminated.

In the above embodiments, by determining the current interpreting scheme for interpreting the PRB resource assignment field based on the current state, interpreting the received current reserve status based on the current interpreting scheme, and performing the corresponding operation based on the interpreted result, the UE can interpret the received current reserve status correctly even if the UE is configured simultaneously with two functions comprising an early termination of uplink transmission and a flexible resource allocation, thereby avoiding a confusion in behavior of the UE.

Figure 3:
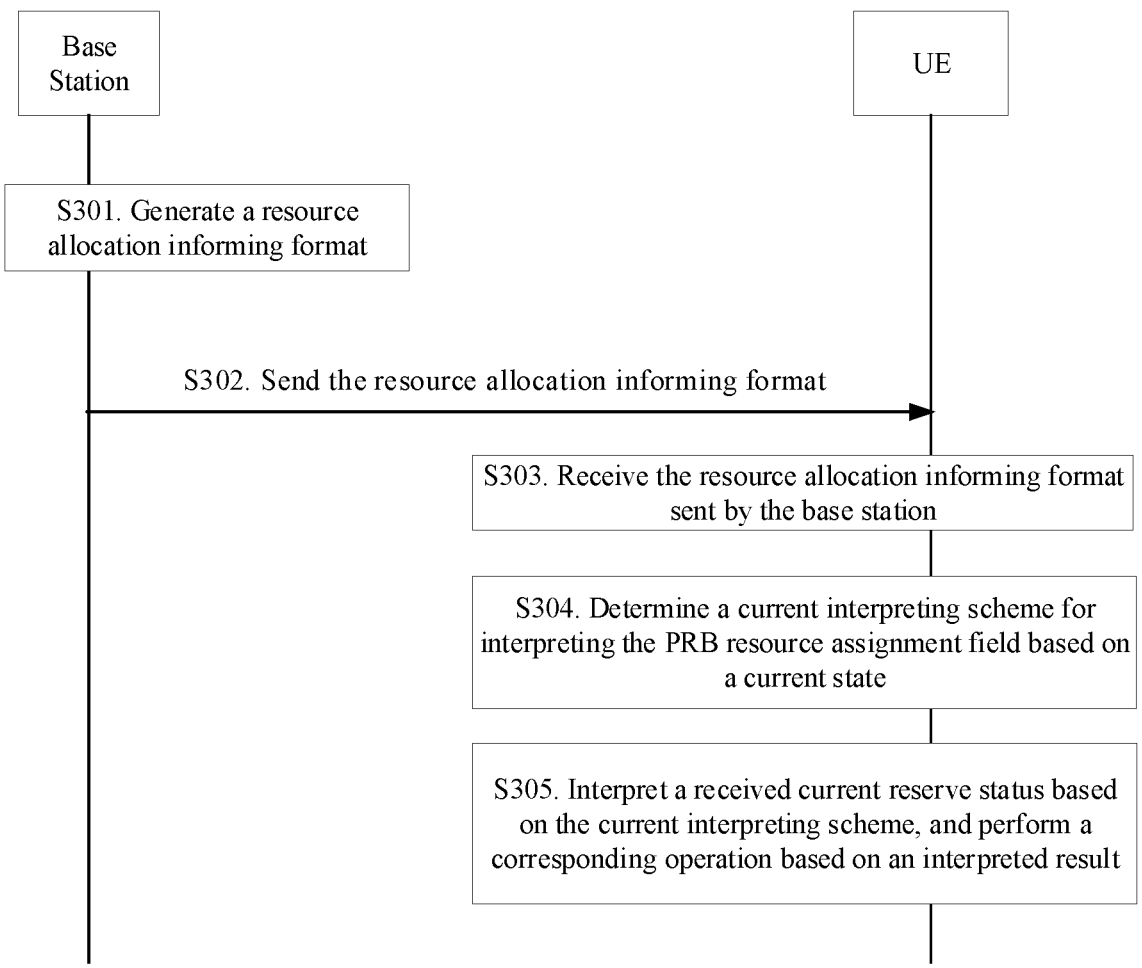
FIG. 3 is a signaling flowchart illustrating a method of interpreting information according to an example of the present disclosure.

FIG. 3 is a signaling flowchart illustrating a method of interpreting information according to an example of the present disclosure. This embodiment is described from the perspective of interaction between a base station and UE. As shown in FIG. 3, the method includes the following steps.

At step S301, the base station generates a resource allocation informing format. The resource allocation informing format includes a first informing format or a second informing format. The first informing format indicates that each of reserve statuses in a PRB resource assignment field is configured for indicating a resource allocation scheme. The second informing format indicates that one or more of the reserve statuses in the PRB resource assignment field is configured for indicating an early termination of uplink transmission while each of remaining reserve statuses is configured for indicating the resource allocation scheme.

At step S302, the base station sends the resource allocation informing format to the UE.

At step S303, the UE receives the resource allocation informing format sent by the base station.

At step S304, the UE determines a current interpreting scheme for interpreting the PRB resource assignment field based on a current state. The interpreting scheme includes a first interpreting scheme or a second interpreting scheme, with the first interpreting scheme corresponding to the first informing format and the second interpreting scheme corresponding to the second informing format.

At step S305, the UE interprets a received current reserve status based on the current interpreting scheme, and performs a corresponding operation based on an interpreted result.

In the above embodiment, via the interaction between the base station and the UE, the UE can interpret a received current reserve status correctly even if the UE is configured simultaneously with two functions comprising an early termination of uplink transmission and a flexible resource allocation, thereby avoiding a confusion in behavior of the UE.

Figure 4:
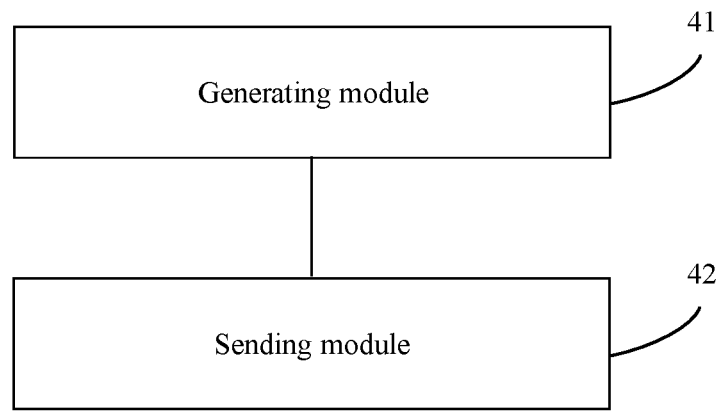
FIG. 4 is a block diagram illustrating an apparatus for indicating information according to an example.

FIG. 4 is a block diagram illustrating an apparatus for indicating information according to an example. The apparatus may be located in a base station. As shown in FIG. 4, the apparatus includes a generating module 41 and a sending module 42.

The generating module 41 is configured to generate a resource allocation informing format. The resource allocation informing format includes a first informing format or a second informing format. The first informing format indicates that each of reserve statuses in a PRB resource assignment field is configured for indicating a resource allocation scheme. The second informing format indicates that one or more of the reserve statuses in the PRB resource assignment field is configured for indicating an early termination of uplink transmission while each of remaining reserve statuses is configured for indicating the resource allocation scheme.

The sending module 42 is configured to send the resource allocation informing format generated by the generating module 41 to UE.

The resource allocation informing format may be sent to the UE after being generated.

In the above embodiments, by generating the resource allocation informing format and transmitting it to the UE, the UE can interpret a received current reserve status correctly even if the UE is configured simultaneously with two functions comprising an early termination of uplink transmission and a flexible resource allocation, thereby avoiding a confusion in behavior of the UE.

Figure 5:
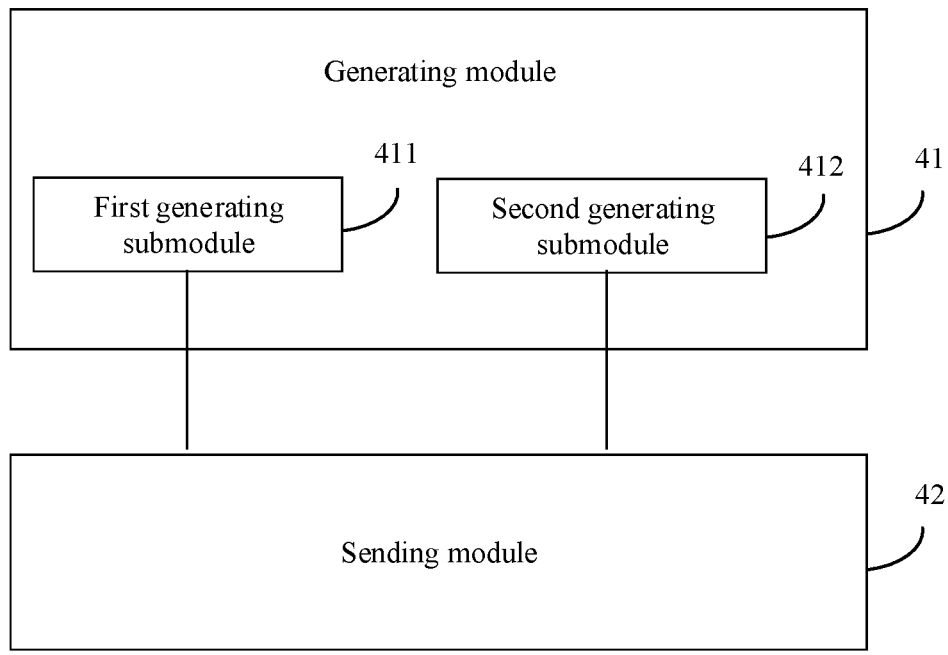
FIG. 5 is a block diagram illustrating another apparatus for indicating information according to an example.

FIG. 5 is a block diagram illustrating another apparatus for indicating information according to an example. As shown in FIG. 5, on a basis of the above embodiment shown in FIG. 4, the generating module 41 may include a first generating submodule 411 or the second generating submodule 412.

The first generating submodule 411 is configured to generate the second informing format when the UE is configured with a function for the early termination of uplink transmission.

The second generating submodule 412 is configured to generate the first informing format when the UE is not configured with the function for the early termination of uplink transmission.

In one or more embodiments, the resource allocation informing format may be generated based on the function configured in the UE. For example, the second informing format may be generated when the UE is configured with the function for the early termination of uplink transmission, and the first informing format may be generated when the UE is not configured with the function for the early termination of uplink transmission.

In some embodiments, the generated first informing format may be as shown in Table 3:

TABLE 3

The meanings of the PBR resource assignment field in the first informing format

| PRB resource assignment field | Physical meaning |
|---|---|
| 00000 (0)-10100(20) | indicating a PRB resource allocation scheme within NB |
| reserve statuses 10101(21)-11111 (31) | indicating a resource allocation scheme |

In some embodiments, the generated second informing format may be as shown in Table 4:

TABLE 4

The meanings of the PBR resource assignment field in the second informing format

| PRB resource assignment field | Physical meaning |
|---|---|
| 00000 (0)-10100(20) | indicating a PRB resource allocation scheme within NB |

TABLE 4-continued

The meanings of the PBR resource assignment
field in the second informing format

| PRB resource assignment field | Physical meaning |
| --- | --- |
| reserve statuses 10101(21)-11110 (30) | indicating a resource allocation scheme |
| reserve status 11111 (31) | indicating an early termination of uplink transmission |

It should be noted that the foregoing Table 3 and Table 4 are only examples. In practical applications, the meanings of the PBR resource assignment field indicated by the first informing format and the second informing format may be varied.

In the above embodiments, how to generate the resource allocation informing format is flexible and diverse.

Figure 6:
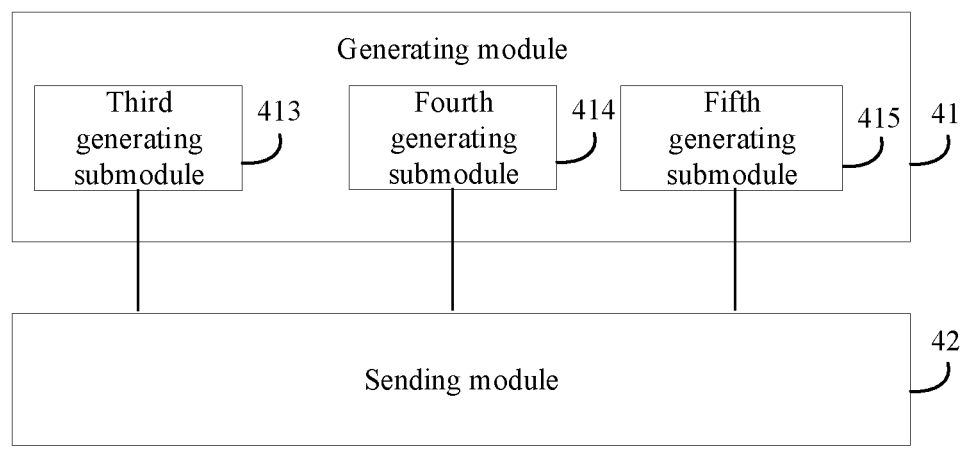
FIG. 6 is a block diagram illustrating another apparatus for indicating information according to an example.

FIG. 6 is a block diagram illustrating another apparatus for indicating information according to an example. As shown in FIG. 6, on a basis of the embodiment shown in FIG. 4, the generating module 41 may include a third generating submodule 413, a fourth generating submodule 414, or the fifth generating submodule 415.

The third generating submodule 413 is configured to generate the second informing format when the UE is configured with a function for the early termination of uplink transmission and is currently performing an uplink transmission.

The fourth generating submodule 414 is configured to generate the first informing format when the UE is configured with the function for the early termination of uplink transmission but is not currently performing the uplink transmission.

The fifth generating submodule 415 is configured to generate the first informing format when the UE is not configured with the function for the early termination of uplink transmission.

In one or more embodiments, the resource allocation informing format may be generated based on both the function configured in the UE and whether the UE is currently performing the uplink transmission. For example, the second informing format may be generated when the UE is configured with the function for the early termination of uplink transmission and is currently performing the uplink transmission, the first informing format may be generated when the UE is configured with the function for the early termination of uplink transmission and is not currently performing the uplink transmission, and the first informing format may be generated when the UE is not configured with the function for the early termination of uplink transmission.

In the above embodiments, how to generate the resource allocation informing format is flexible and diverse.

Figure 7:
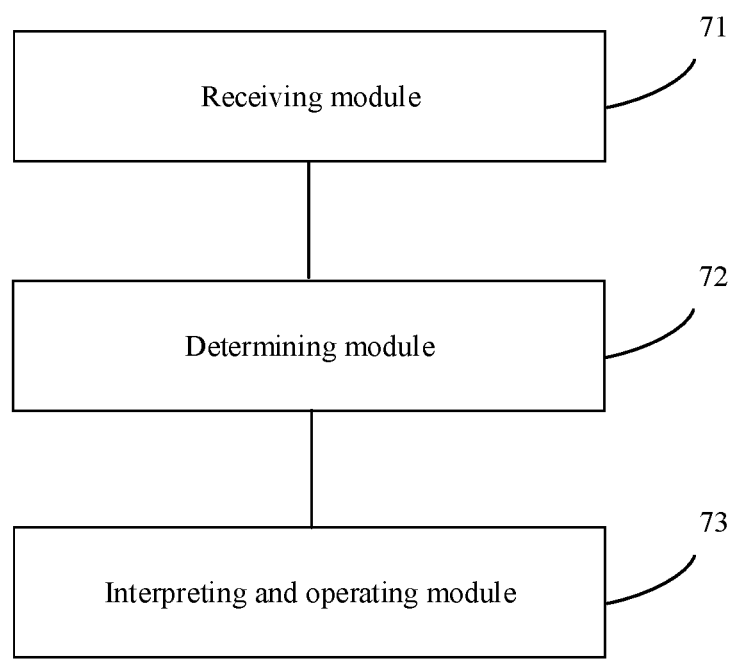
FIG. 7 is a block diagram of an apparatus for interpreting information according to an example.

FIG. 7 is a block diagram illustrating an apparatus for interpreting information according to an example. The apparatus may be located in UE. As shown in FIG. 7, the apparatus includes a receiving module 71, a determining module 72, and an interpreting and operating module 73.

The receiving module 71 is configured to receive a resource allocation informing format sent by a base station. The resource allocation informing format includes a first informing format or a second informing format. The first informing format indicates that each of reserve statuses in a PRB resource assignment field is configured for indicating a resource allocation scheme. The second informing format indicates that one or more of the reserve statuses in the PRB resource assignment field is configured for indicating an early termination of uplink transmission while each of remaining reserve statuses is configured for indicating the resource allocation scheme.

The determining module 72 is configured to determine a current interpreting scheme for interpreting the PRB resource assignment field based on a current state. The interpreting scheme includes a first interpreting scheme or a second interpreting scheme, with first interpreting scheme corresponding to the first informing format received by the receiving module 71 and the second interpreting scheme corresponding to the second informing format received by the receiving module 71.

The interpreting and operating module 73 is configured to interpret a current reserve status based on the current interpreting scheme determined by the determining module 72 corresponding to the received resource allocation informing format, and perform a corresponding operation based on an interpreted result.

The received current reserve status may be interpreted based on the first interpreting scheme if the current interpreting scheme is the first interpreting scheme, and based on the second interpreting scheme if the current interpreting scheme is the second interpreting scheme.

In the above embodiments, by determining the current interpreting scheme for interpreting the PRB resource assignment field based on the current state, interpreting the received current reserve status based on the current interpreting scheme, and performing the corresponding operation based on the interpreted result, the UE can interpret the received current reserve status correctly even if the UE is configured simultaneously with two functions comprising an early termination of uplink transmission and a flexible resource allocation, thereby avoiding a confusion in behavior of the UE.

Figure 8:
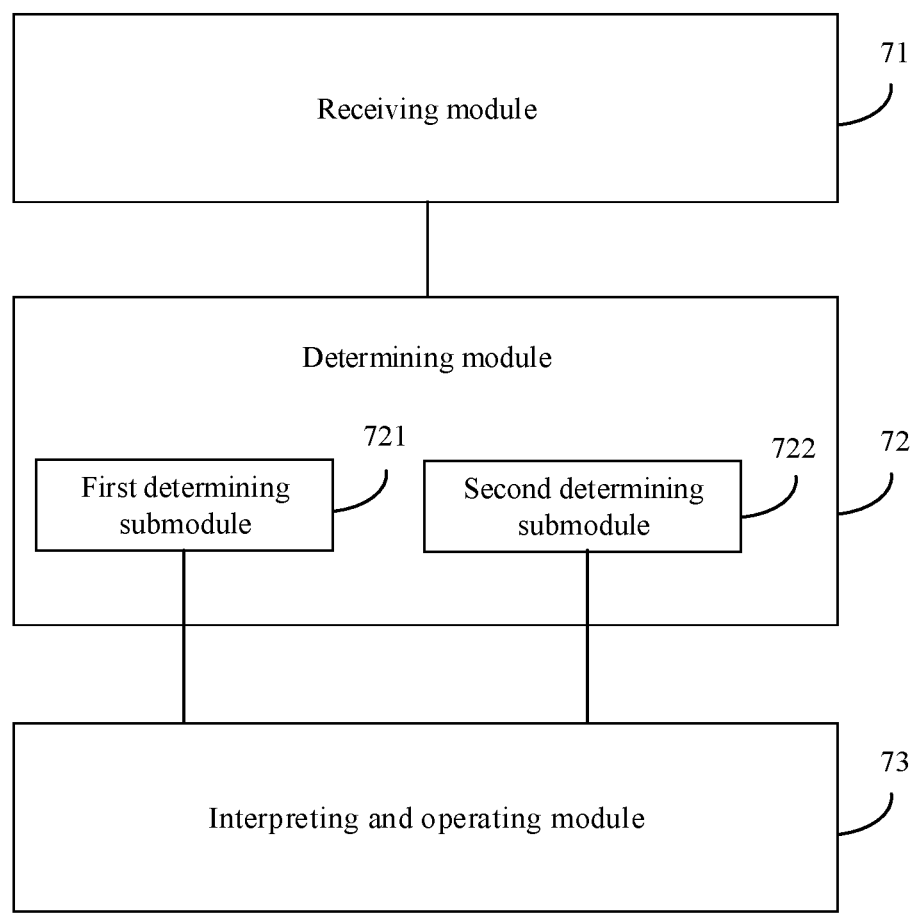
FIG. 8 is a block diagram of another apparatus for interpreting information according to an example.

FIG. 8 is a block diagram illustrating another apparatus for interpreting information according to an example. As shown in FIG. 8, on a basis of the embodiment shown in FIG. 7, the determining module 72 may include a first determining submodule 721 or a second determining submodule 722.

The first determining submodule 721 is configured to determine to adopt the second interpreting scheme if the UE is configured with a function for the early termination of uplink transmission.

The second determining submodule 722 is configured to determine to adopt the first interpreting scheme if the UE is not configured with the function for the early termination of uplink transmission.

In the above embodiments, the current interpreting scheme for interpreting the PRB resource assignment field can be determined in a variety of ways, with flexible and diverse implementations.

Figure 9:
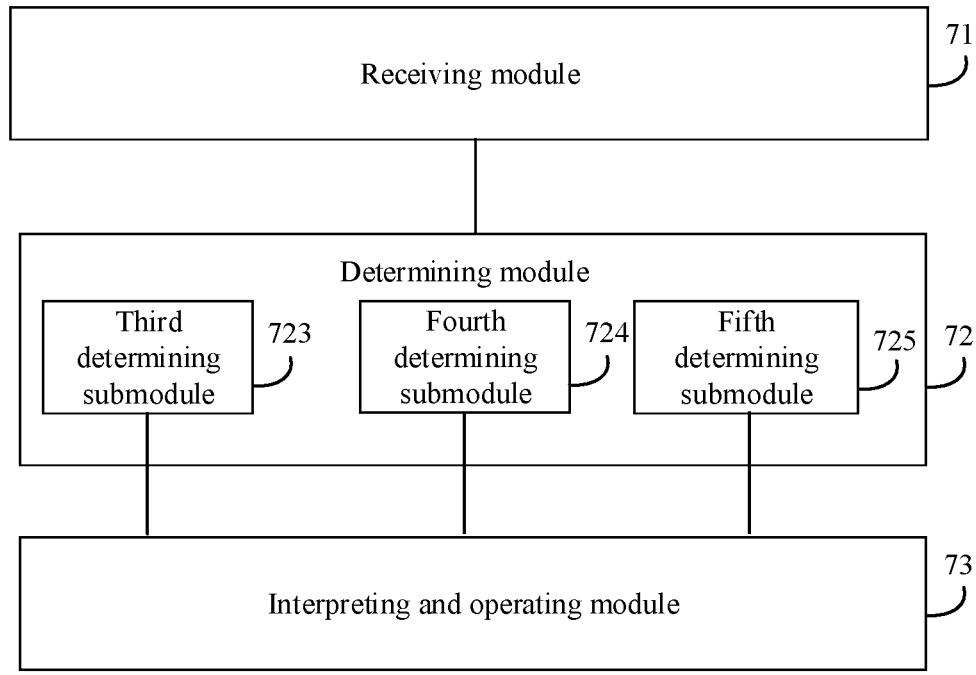
FIG. 9 is a block diagram of another apparatus for interpreting information according to an example.

FIG. 9 is a block diagram illustrating another apparatus for interpreting information according to an example. As shown in FIG. 9, on a basis of the embodiment shown in FIG. 7, the determining module 72 may include a third determining submodule 723, the fourth determining submodule 724, or the fifth determining submodule 725.

The third determining submodule 723 is configured to determine to adopt the second interpreting scheme if the UE is configured with a function for the early termination of uplink transmission and is currently performing an uplink transmission.

The fourth determining submodule 724 is configured to determine to adopt the first interpreting scheme if the UE is configured with the function for the early termination of uplink transmission but is not currently performing the uplink transmission.

The fifth determining submodule 725 is configured to determine to adopt the first interpreting scheme if the UE is not configured with the function for the early termination of uplink transmission.

In the above embodiments, the current interpreting scheme for interpreting the PRB resource assignment field can be determined in a variety of ways, with flexible and diverse implementations.

Figure 10:
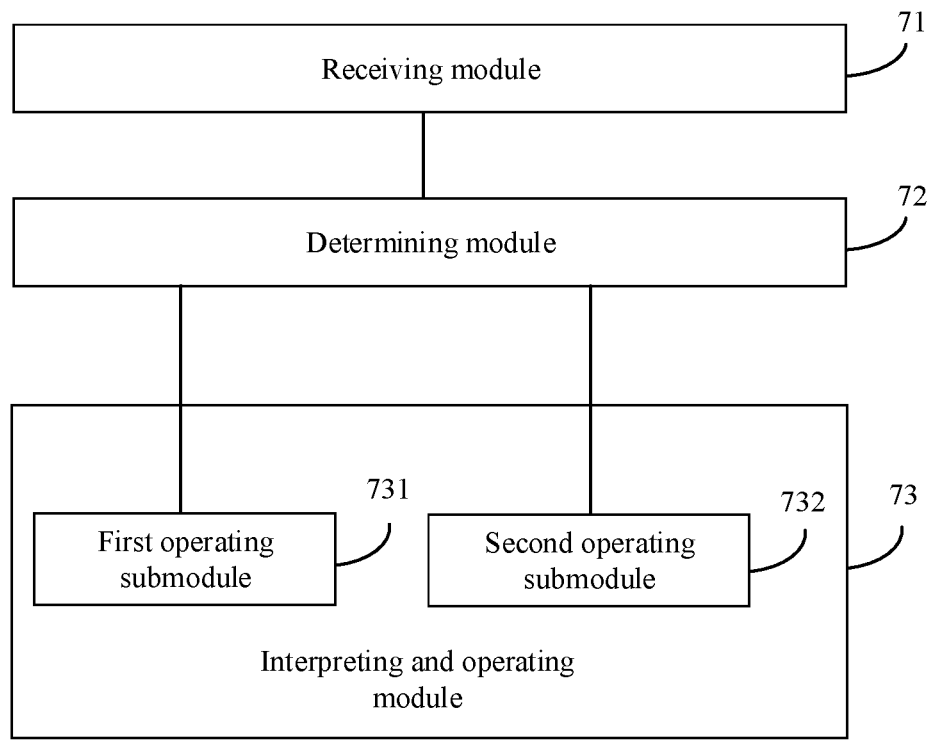
FIG. 10 is a block diagram of another apparatus for interpreting information according to an example.

FIG. 10 is a block diagram illustrating another apparatus for interpreting information according to an example. As shown in FIG. 10, on a basis of the embodiment shown in FIG. 7, the interpreting and operating module 73 may include a first operating submodule 731 or a second operating submodule 732.

The first operating submodule 731 is configured to terminate an ongoing repetition transmission of uplink data if the interpreted result is the current reserve status indicating the early termination of uplink transmission.

The second operating submodule 732 is configured to operate with one or more allocated resources if the interpreted result is the current reserve status indicating an identifier of the one or more allocated resources.

In some embodiments, if the interpreted result is that the current reserve status indicates the identifier of the one or more allocated resources, an operation may be performed with the one or more allocated resources, for example, data may be transmitted with the one or more allocated resources. And, if the interpreted result is that the current reserve status indicates the early termination of uplink transmission, the ongoing repetition transmission of uplink data is terminated.

In the above embodiments, the corresponding operation can be performed based on the interpreted result, with flexible and diverse implementations.

Figure 11:
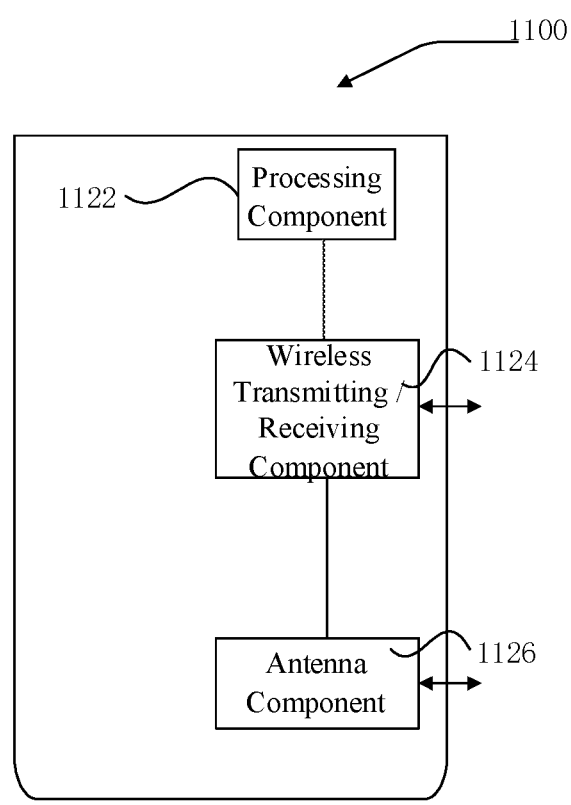
FIG. 11 is a block diagram illustrating a device applicable to indicating information according to an example.

FIG. 11 is another block diagram illustrating another device applicable to indicating information according to an example. The device 1100 may be provided as a base station. As shown in FIG. 11, the device 1100 includes a processing component 1122, a wireless transmitting/receiving component 1124, an antenna component 1126, and a signal processing part unique to a wireless interface. The processing component 1122 may further include one or more processors.

One of the processors of the processing component 1122 may be configured to: generate a resource allocation informing format which includes a first informing format indicating that each of reserve statuses in a PRB resource assignment field is configured for indicating a resource allocation scheme, or a second informing format indicating that one or more of the reserve statuses in the PRB resource assignment field is configured for indicating an early termination of uplink transmission while each of the remaining reserve statuses is configured for indicating the resource allocation scheme; and send the resource allocation informing format to UE.

In an example, a non-transitory computer-readable storage medium including instructions is provided, and the instructions may be executed by the processing component 1122 of the device 1100 to complete the above methods of indicating information. For example, the non-transitory computer-readable storage medium may be a Read-Only Memory (ROM), a Random Access Memory (RAM), CD-ROM, a magnetic tape, a floppy disk, an optical data storage device, and the like.

Figure 12:
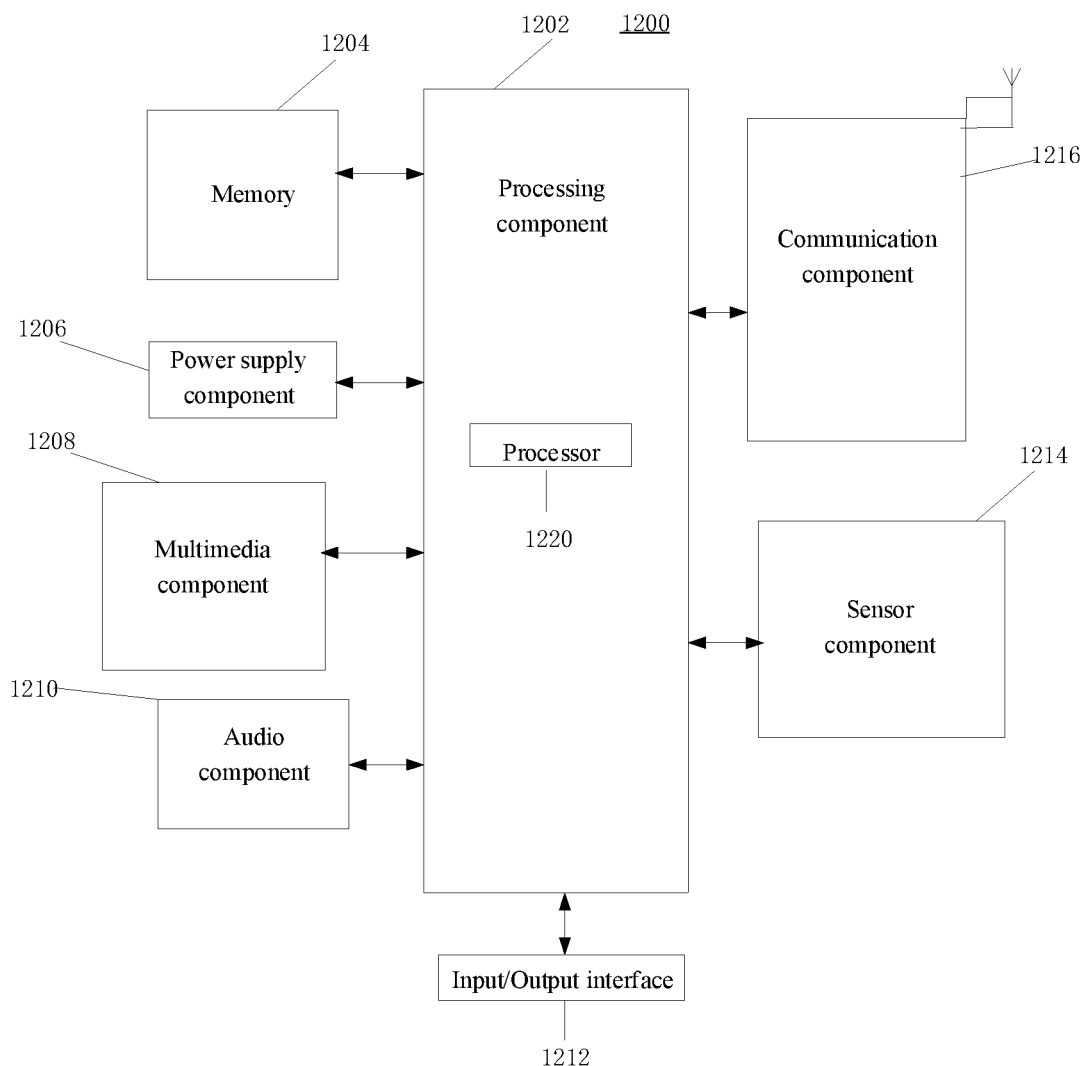
FIG. 12 is a block diagram illustrating a device applicable to interpreting information according to an example.

FIG. 12 is a block diagram illustrating a device applicable to interpreting information according to an example. For example, the device 1200 may be a mobile phone, a computer, a digital broadcast terminal, a message receiving and transmitting device, a game console, a tablet device, a medical device, a fitness device, a personal digital assistant, and other user equipment.

As shown in FIG. 12, the device 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the overall operation of the device 1200, such as operations associated with display, telephone calls, data communications, camera operations, and recording operations. The processing component 1202 may include one or more processors 1220 to execute instructions to complete all or part of the steps of the above methods. Moreover, the processing component 1202 can include one or more modules to facilitate interaction between the processing component 1202 and other components. For example, the processing component 1202 may include a multimedia module to facilitate the interaction between the multimedia component 1208 and the processing component 1202.

One of the processors 1220 of the processing component 1202 may be configured to: receive a resource allocation informing format which is sent by a base station and includes a first informing format indicating that each of reserve statuses in a PRB resource assignment field is configured for indicating a resource allocation scheme, or a second informing format indicating that one or more of the reserve statuses in the PRB resource assignment field is configured for indicating an early termination of uplink transmission while each of remaining reserve statuses is configured for indicating the resource allocation scheme; determine a current interpreting scheme for interpreting the PRB resource assignment field based on a current state, where the interpreting scheme includes a first interpreting scheme corresponding to the first informing format or a second interpreting scheme corresponding to the second informing format; and interpret a received current reserve status based on the current interpreting scheme, and perform an operation based on an interpreted result.

The memory 1204 is configured to store various types of data to support the operation of the device 1200. Examples of such data include instructions for any application or method operated on the device 1200, contact data, phonebook data, messages, pictures, videos, and the like. The memory 1204 may be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power supply component 1206 provides power to different components of the device 1200. The power supply component 1206 may include a power management system, one or more power supplies, and other components associated with generating, managing, and distributing power for the device 1200.

The multimedia component 1208 includes a screen providing an output interface between the device 1200 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 includes a front camera and/or a rear camera. The front camera and/or rear camera may receive external multimedia data when the device 1200 is in an operating mode, such as a photographing mode or a video mode. Each front camera and rear camera may be a fixed optical lens system or have focal length and optical zooming capability.

The audio component 1210 is configured to output and/or input an audio signal. For example, audio component 1210 includes a microphone (MIC) that is configured to receive an external audio signal when the device 1200 is in an operational mode, such as a call mode, a recording mode, and a voice recognition mode. The received audio signal may be further stored in memory 1204 or transmitted via communication component 1216. In some embodiments, the audio component 1210 also includes a speaker for outputting an audio signal.

The I/O interface 1212 may provide interfaces between the processing component 1202 and peripheral interface modules. The peripheral interface modules may include a keyboard, a click wheel, buttons and the like. These buttons may include but not limited to, a home button, a volume button, a start button and a lock button.

The sensor component 1214 includes one or more sensors for providing the device 1200 with a status assessment of various aspects. For example, the sensor component 1214 may detect the on/off status of the device 1200, and relative positioning of components, such as a display and a keypad of the device 1200. The sensor component 1214 may also detect a change in position of the device 1200 or a component of the device 1200, the presence or absence of user contact with the device 1200, orientation or acceleration/deceleration of the device 1200, and temperature change of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an acceleration sensor, a gyro sensor, a magnetic sensor, a pressure sensor, or a temperature sensor.

The communication component 1216 is configured to facilitate wired or wireless communication between the device 1200 and other devices. The device 1200 may access a wireless network based on a communication standard, such as WiFi, 2G or 3G, or a combination thereof. In an example, the communication component 1216 receives a broadcast signal or broadcast-associated information from an external broadcast management system via a broadcast channel. In one example, the communication component 1216 may further include a Near Field Communication (NFC) module for facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an example, the device 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer-readable storage medium including instructions, such as the memory 1204 including instructions. The above instructions may be executed by the processor 1220 of the device 1200 to complete the above methods. For example, the non-transitory computer-readable storage medium may be a Read-Only Memory (ROM), a Random Access Memory (RAM), CD-ROM, a magnetic tape, a floppy disk, an optical data storage device, and the like.

Since the apparatus embodiments essentially correspond to the method embodiments, reference may be made to the description of related parts of the method embodiments. The apparatus embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the implementations of the embodiments. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common knowledge or conventional technical means in the art that are not disclosed in the present disclosure. The specification and embodiments therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. A method of indicating information, being applicable to a base station, comprising:
   generating a resource allocation informing format that comprises one of reserve statuses in a physical resource block (PRB) resource assignment field is configured for indicating an early termination of uplink transmission while each of remaining reserve statuses is configured for indicating the resource allocation scheme; and sending the resource allocation informing format to user equipment (UE);
wherein the PRB resource assignment field is a 5-bits bitmap,
wherein each of the reserve statuses 00000-10100 is configured for indicating a PRB resource allocation scheme within a narrowband (NB),
wherein each of the reserve statuses 10101-11110 is configured for indicating the resource allocation scheme, and
wherein the reserve status 11111 is configured for indicating the early termination of uplink transmission.

2. The method according to claim 1, wherein generating the resource allocation informing format comprises:
generating the resource allocation informing format in response to that the UE is configured with a function for the early termination of uplink transmission.

3. The method according to claim 1, wherein generating the resource allocation informing format comprises:
generating the resource allocation informing format in response to that the UE is configured with a function for the early termination of uplink transmission and is currently performing an uplink transmission.

4. A method of interpreting information, being applicable to user equipment (UE), comprising:
receiving a resource allocation informing format sent by a base station, wherein the resource allocation informing format comprises—
one of reserve statuses in a physical resource block (PRB) resource assignment field is configured for indicating an early termination of uplink transmission while each of remaining reserve statuses is configured for indicating the resource allocation scheme;
determining an interpreting scheme for interpreting the PRB resource assignment field based on a current state, wherein the interpreting scheme corresponding to the resource allocation informing format;
interpreting a received current reserve status based on the determined interpreting scheme; and
performing an operation based on an interpreted result;
wherein the PRB resource assignment field is a 5-bits bitmap,
wherein each of the reserve statuses 00000-10100 is configured for indicating a PRB resource allocation scheme within a narrowband (NB),
wherein each of the reserve statuses 10101-11110 is configured for indicating the resource allocation scheme, and
wherein the reserve status 11111 is configured for indicating the early termination of uplink transmission.

5. The method according to claim 4, wherein in response to determining that the current state comprises a current configuration, determining the interpreting scheme for interpreting the PRB resource assignment field based on the current state comprises:
determining the interpreting scheme in response to that the UE is configured with a function for the early termination of uplink transmission.

6. The method according to claim 4, wherein in response to determining that the current state comprises a current configuration and a current operation, determining the interpreting scheme for interpreting the PRB resource assignment field based on the current state comprises:
determining the interpreting scheme in response to that the UE is configured with a function for the early termination of uplink transmission and is currently performing an uplink transmission.

7. The method according to claim 4, wherein performing the operation based on the interpreted result comprises:
terminating an ongoing repetition transmission of uplink data in response to that the interpreted result is the current reserve status indicating the early termination of uplink transmission; or
operating with one or more allocated resources in response to that the interpreted result is the current reserve status indicating an identifier of the one or more allocated resources.

8. A base station, comprising:
a processor; and
a memory for storing instructions executable by the processor;
wherein the processor is configured to:
generate a resource allocation informing format that comprises—
one of reserve statuses in a physical resource block (PRB) resource assignment field is configured for indicating an early termination of uplink transmission while each of remaining reserve statuses is configured for indicating the resource allocation scheme; and
send the resource allocation informing format to user equipment (UE);
wherein the PRB resource assignment field is a 5-bits bitmap,
wherein each of the reserve statuses 00000-10100 is configured for indicating a PRB resource allocation scheme within a narrowband (NB),
wherein each of the reserve statuses 10101-11110 is configured for indicating the resource allocation scheme, and
wherein the reserve status 11111 is configured for indicating the early termination of uplink transmission.

9. The base station according to claim 8, wherein when generating the resource allocation informing format, the processor is configured to:
generate the resource allocation informing format in response to that the UE is configured with a function for the early termination of uplink transmission.

10. The base station according to claim 8, wherein when generating the resource allocation informing format, the processor is configured to:
generate the resource allocation informing format in response to that the UE is configured with a function for the early termination of uplink transmission and is currently performing an uplink transmission.

11. A user equipment, comprising:
a processor; and
a memory for storing instructions executable by the processor;
wherein the processor is configured to:
receive a resource allocation informing format that is sent by a base station, wherein the resource allocation informing format comprises—
one of reserve statuses in a physical resource block (PRB) resource assignment field is configured for indicating an early termination of uplink transmission while each of remaining reserve statuses is configured for indicating the resource allocation scheme;
determine an interpreting scheme for interpreting the PRB resource assignment field based on a current state, wherein the interpreting scheme corresponding to the resource allocation informing format;

interpret a received current reserve status based on the determined interpreting scheme; and perform an operation based on an interpreted result;

wherein the PRB resource assignment field is a 5-bits bitmap, wherein each of the reserve statuses 00000-10100 is configured for indicating a PRB resource allocation scheme within a narrowband (NB), wherein each of the reserve statuses 10101-11110 is configured for indicating the resource allocation scheme, and wherein the reserve status 11111 is configured for indicating the early termination of uplink transmission.

12. The user equipment according to claim 11, wherein in response to determining that the current state comprises a current configuration, when determining the interpreting scheme for interpreting the PRB resource assignment field based on the current state, the processor is configured to:

determine the interpreting scheme in response to that the UE is configured with a function for the early termination of uplink transmission.

13. The user equipment according to claim 11, wherein in response to determining that the current state comprises a current configuration and a current operation, when determining the interpreting scheme for interpreting the PRB resource assignment field based on the current state, the processor is configured to:

determine the interpreting scheme in response to that the UE is configured with a function for the early termination of uplink transmission and is currently performing an uplink transmission.

14. The user equipment according to claim 11, wherein when performing the operation based on the interpreted result, the processor is configured to:

terminate an ongoing repetition transmission of uplink data in response to that the interpreted result is the current reserve status indicating the early termination of uplink transmission; or operate with one or more allocated resources in response to that the interpreted result is the current reserve status indicating an identifier of the one or more allocated resources.

15. A non-transitory computer-readable storage medium having computer instructions stored thereon, when the instructions are executed by a processor, the steps of the method of indicating information according to claim 1 are implemented.

16. A non-transitory computer-readable storage medium having computer instructions stored thereon, when the instructions are executed by a processor, the steps of the method of interpreting information according to claim 4 are implemented.

* * * * *